UNITED STATES PATENT OFFICE 2,495,048

1,2-DIHYDROBENZO-(f)-QUINOLIN-3-OL, AND ITS METHOD OF PREPARATION

William F. Amon, Jr., Riegelsville, Pa., assignor to General Aniline & Film Corporation, New York, N. Y., a corporation of Delaware No Drawing. Application November 9, 1948, Serial No. 59,188

3 Claims. (Cl. 260—289)

The present invention relates to 1,2-dihydrobenzo-(f)-quinolin-3-ol, and to a method of preparing the same.

Many derivatives of quinolin have been described in the prior art. However, 1,2-dihydrobenzo-(f)-quinolin-3-ol, a very interesting compound as is evident from its structure, has been nowhere previously described.

Attempts to produce this compound by heating 1-cyanoethyl-2-naphthol with water at 140° C. fails to cause any ring closure to the lactam. A mixture of water, ammonium bisulfite and 2-hydroxy-1-naphthalene-β-propionic acid, when heated to 140° C. in an autoclave, "tars up" in about 7 hours. Even after 12 hours of heating, no ring closure resulted.

I have now discovered that the 1,2-dihydrobenzo-(f)-quinolin-3-ol may be prepared in good yields by heating 1-cyanoethyl-2-naphthol (2-hydroxy-1-naphthalene-β-propionitrile) with aqueous ammonium bisulfite to a temperature of about 140 to 180° C. under pressure.

Such product and the aforesaid method of producing the same constitute the purposes and objects of the present invention.

The reaction is generally carried out by heating the aforestated compounds in an autoclave to the desired temperature range of 140 to 180° C. At these temperatures the pressure which develops in the autoclave ranges from about 100 to 200 lbs. per square inch.

The ammonium bisulfite which is employed is preferably prepared by bubbling sulfur dioxide gas slowly into cold concentrated ammonium hydroxide until the calculated amount is absorbed. An efficacious ammonium bisulfite reagent is obtained from the use of about 14–15 mols of ammonium hydroxide to about 3 to 4 mols of sulfur dioxide gas.

The proportions of the reagents may be varied but I have found that the reaction proceeds very expeditiously when utilizing about 1 mol of the 1-cyanoethyl-2-naphthol suspended in a liquor comprising 14–15 mols of water, 6–7 mols of ammonia, and 1–2 mols of sulfur dioxide.

The 1-cyanoethyl-2-naphthol may be prepared by refluxing in benzene solution β-naphthol with acrylonitrile in the presence of a strong alkali such as sodium hydroxide, potassium hydroxide, or the like. The reaction is somewhat exothermic so that once the reaction has started it proceeds almost without the further application of heat. After refluxing for 2½ hrs., during which time two layers have separated, the reaction mixture while warm is diluted with water and acidified to precipitate the 1-cyanoethyl-2-naphthol.

The reactions leading to the formation of the 1,2-dihydrobenzo-(f)-quinolin-3-ol may be exemplified by the following equations:

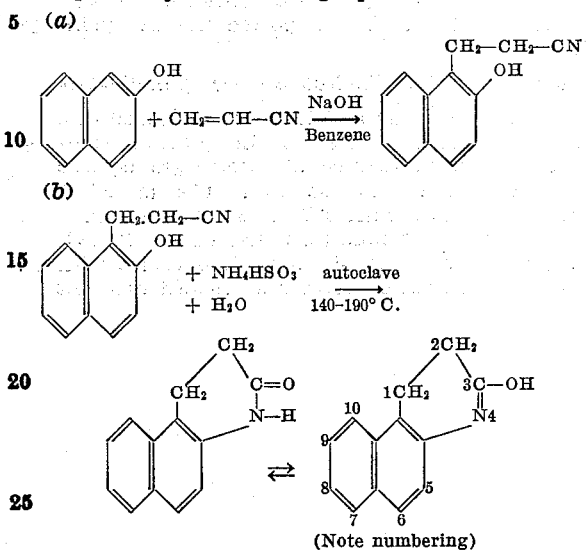

(Note numbering)

It is apparent from this that the quinolin-ol obtained is tautomeric with the lactam.

The 1,2-dihydrobenzo-(f)-quinolin-3-ol may be dehydrogenated by heating with a dehydrogenating catalyst comprising 10% of palladium on activated charcoal powder to produce the completely unsaturated ring compound benzo-(f)-quinolin-3-ol in a good yield. The product is precipitated from acetic acid in pale yellow crystals having a melting point of about 280° C.

The product may also be nitrated in concentrated sulfuric acid at a temperature of —15 to —25° C. A mononitro derivative is thus obtained but up to the present the particular position where the nitro group enters the molecule has not been ascertained. This product is obtained as yellow needles from methanol and has a melting point of about 282° C. The nitro compound is reducible with tin and hydrochloric acid to the corresponding amine.

An important use of the 1,2-dihydrobenzo-(f)-quinolin-3-ol is in the preparation of pigments which may be obtained by heating the product with phosphorous oxychloride or thionyl chloride. The pigment obtained with the phosphorous oxychloride is a brilliant red pigment which is insoluble in most solvents. Its constitution is unknown. The pigment produced with the thionyl chloride, on the other hand, is bright yellow in color, its constitution likewise being unascertained.

The invention is further explained by the following example, but it is to be understood that the example is illustrative and not limitative.

EXAMPLE

*Preparation of 1-cyanoethyl-2-naphthol*

580 g. (4.0 m.) of β-naphthol, 240 g. (298 cc.) (4.5 m.) of acrylonitrile, 180 g. (4.5 m.) of sodium hydroxide pellets, and 1.1 liter of benzene in a 5-liter flask are heated on a steam bath at vigorous reflux until two well-defined layers separate. This usually occurs in about 2½ hours. While still warm, 2 liters of water are added and the mixture stirred to dissolve the remaining hydroxide pellets. The water layer is then collected and acidified to pH 4 with glacial acetic acid. The precipitated product is collected on a Buchner, slurried in 5 liters of hot water (hot tap water), and recollected. Yield 94.5%. Crystallization from technical methanol gives in approximately 66% yield a product with melting point of 140–141° C. Reported melting point 142° C.

*Preparation of 1.2-dihydrobenzo-(f)-quinolin-3-ol*

To 470 g. (2.37 m.) of the above is added in a stirring 2-liter autoclave a freshly prepared solution consisting of 980 cc. of specific gravity 0.90 ammonium hydroxide solution (14.4 m. $NH_3$) saturated (cold) with 237 g. (3.7 m.) of sulfur dioxide gas. The mixture is heated at 140–180° C. for 12 hours with stirring. It is cooled with stirring and then collected and washed with hot water. Finally it is slurried with approximately 1 liter of methanol and again collected on a Buchner. Crystallization from cyclohexanone, methyl benzoate, or dioxane gives in approximately 55% yield the product as colorless plates—melting point 245° C. Soluble in acetic acid and dilute sulfuric acid, less soluble in xylene and butanol and insoluble in water and alcohol.

Analysis: Calc. for $C_{13}H_{11}NO$: C 79.16; H 5.62; N 7.10. Found: C 78.86; H 5.64, 5.56; N 7.54, 7.35.

Various modifications of the invention will occur to persons skilled in this art, and I therefore do not intend to be limited in the patent granted except as necessitated by the appended claims.

I claim:

1. The process of producing 1.2-dihydrobenzo-(f)-quinolin-3-ol, which comprises heating 1-cyanoethyl-2-naphthol with aqueous ammonium bisulfite under pressure.

2. The process as defined in claim 1 wherein the reaction mixture is heated in an autoclave to a temperature of 140 to 180° C.

3. 1.2-dihydrobenzo-(f)-quinolin-3-ol of the following structure:

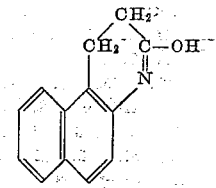

WILLIAM F. AMON, Jr.

No references cited.